US012717082B2

(12) United States Patent
Zhang

(10) Patent No.: US 12,717,082 B2
(45) Date of Patent: Aug. 25, 2026

(54) OPTICAL SENSOR CHIP AND OPTICAL SENSING SYSTEM

(71) Applicant: Silith Technology (Suzhou) Co., Ltd., Shanghai (CN)

(72) Inventor: Xingyu Zhang, Shanghai (CN)

(73) Assignee: SILITH TECHNOLOGY PTE. LTD., Singapore (SG)

( * ) Notice: Subject to any disclaimer, the term of this patent is extended or adjusted under 35 U.S.C. 154(b) by 635 days.

(21) Appl. No.: 18/035,819

(22) PCT Filed: Feb. 25, 2022

(86) PCT No.: PCT/CN2022/078000
§ 371 (c)(1),
(2) Date: May 8, 2023

(87) PCT Pub. No.: WO2023/071004
PCT Pub. Date: May 4, 2023

(65) Prior Publication Data

US 2023/0417992 A1 Dec. 28, 2023

(30) Foreign Application Priority Data

Oct. 27, 2021 (CN) ......................... 202111255402.2

(51) Int. Cl.
*G02B 6/12* (2006.01)
*G01N 21/85* (2006.01)
(Continued)

(52) U.S. Cl.
CPC ............. *G02B 6/126* (2013.01); *G01N 21/85* (2013.01); *G02B 6/1228* (2013.01); *G02B 27/283* (2013.01); *G02B 27/286* (2013.01)

(58) Field of Classification Search
CPC .... G02B 6/126; G02B 6/1228; G02B 27/283; G02B 27/286; G01N 21/85
See application file for complete search history.

(56) References Cited

U.S. PATENT DOCUMENTS 5,606,633 A * 2/1997 Groger ............... G01N 21/7703 385/11
8,923,660 B2 * 12/2014 Dorin .................. G02B 27/286 385/14

(Continued)

OTHER PUBLICATIONS

Chen et al., Broadband adiabatic polarization rotator-splitter based on a lithium niobate on insulator platform. Photonics Research, 9(12), 2319-2324; Jan. 12, 2021; https://doi.org/10.1364/PRJ.432906 (Year: 2021).*

(Continued)

*Primary Examiner* — Peter Radkowski

(57) ABSTRACT

The invention provides an optical sensor chip and an optical sensing system, wherein the optical sensor chip of the invention comprises a bottom cladding, a top cladding stacked on the bottom cladding and an optical waveguide core, the optical waveguide core is arranged between the top cladding and the bottom cladding, the top cladding is provided with an opened region for accommodating a sample to be tested, a part of the optical waveguide core is exposed through the opened region, the optical waveguide core comprises a first polarization rotator and a first polarization splitter, the first polarization splitter includes one input port and two output ports for outputting polarized light, the first polarization rotator is provided with a first end and a second end, the second end of the first polarization rotator is communicated with the input port of the first polarization splitter, and a dimension of the first polarization rotator gradually increases from the first end to the second end. The optical sensor chip of the invention can be designed in different sizes as required, does not need to be provided in a large volume, is convenient to use, does not need a tunable laser, and is low in cost.

15 Claims, 12 Drawing Sheets

(51) Int. Cl.

| | |
|---|---|
| ***G02B 6/122*** | (2006.01) |
| ***G02B 6/126*** | (2006.01) |
| ***G02B 27/28*** | (2006.01) |

(56) References Cited

U.S. PATENT DOCUMENTS

| | | | | |
|---|---|---|---|---|
| 9,052,291 | B2 * | 6/2015 | He | H01P 7/00 |
| 9,864,141 | B1 * | 1/2018 | Lin | G02B 6/126 |
| 9,874,696 | B2 * | 1/2018 | Liu | G02B 6/30 |
| 9,915,781 | B1 * | 3/2018 | Lin | G02B 6/14 |
| 9,977,187 | B2 * | 5/2018 | Shi | G02B 6/125 |
| 10,101,532 | B1 * | 10/2018 | Lin | G02B 6/126 |
| 10,133,002 | B2 * | 11/2018 | Lin | G02B 6/2766 |
| 10,451,804 | B2 * | 10/2019 | Liu | G02B 6/2773 |
| 10,809,459 | B2 * | 10/2020 | Liu | G02B 6/30 |
| 2005/0018949 | A1 * | 1/2005 | Yan | B82Y 20/00 385/14 |
| 2012/0298849 | A1 * | 11/2012 | He | H01P 11/00 250/227.14 |
| 2014/0348460 | A1 * | 11/2014 | Dorin | G02F 1/0147 359/256 |
| 2015/0078702 | A1 * | 3/2015 | Dorin | G02F 1/2257 385/11 |
| 2015/0338577 | A1 * | 11/2015 | Shi | G02B 6/125 385/11 |
| 2016/0246005 | A1 * | 8/2016 | Liu | G02B 6/126 |
| 2017/0075063 | A1 * | 3/2017 | Brouckaert | G02B 6/2813 |
| 2017/0227710 | A1 * | 8/2017 | Lamponi | G02B 6/2773 |
| 2018/0100969 | A1 * | 4/2018 | Liu | G01J 3/0218 |
| 2018/0164505 | A1 * | 6/2018 | Lin | G02B 6/126 |
| 2018/0284348 | A1 * | 10/2018 | Lin | G02B 6/2766 |
| 2019/0302361 | A1 * | 10/2019 | Oh | G02B 6/2733 |
| 2020/0003954 | A1 * | 1/2020 | Liu | G02B 6/2766 |
| 2020/0133034 | A1 * | 4/2020 | Schrans | G02F 1/025 |

OTHER PUBLICATIONS

Densmore et al., Sensitive Label-Free Biomolecular Detection Using Thin Silicon Waveguides, Advances in Optical Technologies, vol. 2008, Article ID 725967, 9 pages, doi: 10.1155/2008/725967 (Year: 2008).*

Pandraud et al., Evanescent wave sensing: new features for detection in small volumes, Sensors and Actuators 85. 2000. 158-162 (Year: 2000).*

Stephens et al., Optical and physical characterization of a local evanescent array coupled biosensor: Use of evanescent field perturbations for multianalyte sensing. Sensors and actuators. B, Chemical, 145(2), 769-774. 2010, https://doi.org/10.1016/j.snb.2010.01.046 (Year: 2010).*

Xu et al., Ultra-broadband silicon polarization splitter-rotator based on the multi-mode waveguide, Opt. Express 25, 18485-18491 (2017) (Year: 2017).*

Zhao et al., Ultrahigh Sensitivity Mach-Zehnder Interferometer Sensor Based on a Weak One-Dimensional Field Confinement Silica Waveguide. Sensors 2021, 21, 6600. Oct. 2, 2021. https://doi.org/10.3390/s21196600 (Year: 2021).*

Datta et al., Low-loss composite photonic platform based on 2D semiconductor monolayers, Nature Photonics, vol. 14, 256 Apr. 2020, 256-262, www.nature.com/naturephotonics (Year: 2020).*

Xiong et al., Polarization splitter and rotator with subwavelength grating for enhanced fabrication tolerance. Opt Lett. Dec. 15, 2014;39(24):6931-4. doi: 10.1364/OL.39.006931. PMID: 25503033 (Year: 2014).*

Kozma et al., Integrated planar optical waveguide interferometer biosensors: A comparative review, Biosensors and Bioelectronics 58 (2014) 287-307 (Year: 2014).*

* cited by examiner

OPTICAL SENSOR CHIP AND OPTICAL SENSING SYSTEM

CROSS-REFERENCE

This application claims the priority of Chinese patent application No. 2021112554022 filed on Oct. 27, 2021. The contents of the above application are incorporated herein by reference.

FIELD OF TECHNOLOGY

The invention relates to the technical field of optical sensing, and in particular to an optical sensor chip and an optical sensing system.

BACKGROUND

Optical sensors and instruments work based on optical principles. Optical sensors mainly include optical image sensors, optical measuring sensors, optical mouse sensors, reflective optical sensors, optical biosensors, etc.

An optical biosensing technology mainly includes a surface plasmon resonance (SPR) technology and an integrated silicon photonics technology. The SPR method uses a system including one laser, one prism connected to a gold surface and one detector. In SPR, a test protein is immobilized on a gold surface, an unlabeled query protein is added, and the change in angle of reflection of light caused by binding of the probe to the immobilized protein is measured to characterize the presence of an analyte in real time. The SPR system is relatively large and is often used in laboratory experiments or large equipment. In integrated silicon photonic biosensors, detection is typically performed by binding the biosensor to liquid containing an analyte (such as antibodies and viruses) that interacts with the biosensor resulting in a change in refractive index.

The architecture of the existing silicon photonics biosensor can be divided into several types according to its physical transduction principle. The first type is based on an interferometer structure, for example, a Mach-Zehnder interferometer. The second type is based on a resonator structure, including a ring resonator, a microcavity, a photonic crystal, a Bragg grating, etc. For silicon photonic biosensors with these two structures, the refractive index change is detected by wavelength shift measurement. Specifically, repeated spectrum measurements are performed by scanning a tunable laser, and then these spectra are curve-fitted to extract a peak value and track the change of the peak value over time. Thus, information about the binding of the analyte to the waveguide surface can be obtained.

For example, a sensing system is composed of a silicon photonic chip with a ring resonator and an external tunable laser, and the interaction between biomolecules and the ring resonator is detected by measuring the spectrum. The need for tunable lasers increases the cost to a silicon photonics biosensing solution, and also makes the system bulky. The sensitivity of these sensors can be defined as a spectral shift divided by an exponential change of a top cladding. A detection limit can be defined as a minimum refractive index change that can be measured, and this requires a tunable laser with high tuning resolution and accuracy. The higher the tuning resolution is, the higher the cost of the tunable laser will be, which is inconvenient for commercial use and large-scale popularization.

SUMMARY

The objective of the present invention is to provide an optical sensor chip and an optical sensing system, which are used to get rid of the dependence on a tunable laser and solve the problems of huge size, inconvenient used and high cost of an existing sensing system.

To achieve the above purpose, the present invention provides an optical sensor chip comprising a bottom cladding, a top cladding stacked on the bottom cladding and an optical waveguide core, wherein the optical waveguide core is arranged between the top cladding and the bottom cladding, the top cladding is provided with an opened region for accommodating a sample to be tested, and a part of the optical waveguide core is exposed through the opened region; the optical waveguide core includes a first polarization rotator and a first polarization splitter; the first polarization splitter includes one input port and two output ports; the two output ports include a through port and a coupling port; the through port and the coupling port are both used for outputting polarized light; and the first polarization rotator is collinear with the first polarization splitter, the first polarization rotator is provided with a first end and a second end, the second end of the first polarization rotator is communicated with the input port of the first polarization splitter, and a dimension of the first polarization rotator gradually increases along a direction from the first end to the second end.

The optical sensor chip of the present invention has the beneficial effects that the optical waveguide core is arranged between the top cladding and the bottom cladding and the opened region is arranged in the top cladding so that a sample to be tested can be placed on the optical sensor chip, the sample to be tested can be in contact with and interact with the optical waveguide core, light is launched to the first end of the optical waveguide core, the movement of photons is guided by the optical waveguide core, the dimension of the optical waveguide core gradually increases from the first end to the second end, the photons in the first polarization rotator of the optical waveguide core generate polarization rotation under the action of the refractive index difference between the sample to be tested and the cladding, by coupling the second end of the first polarization rotator with the input port of the first polarization splitter the photons after polarization rotation are input into the first polarization splitter, the photons are output through the two output ports, including a through port and a coupling port, of the first polarization splitter, polarized light includes transverse magnetic (TM) polarized light and transverse electric (TE) polarized light, most of the TM polarized light is output through the through port, a small part of the TE polarized light is output through the through port, most of the TE polarized light is output through the coupling port, and a small part of the TM polarized light is output through the coupling port, so that the characteristics of the sample to be tested can be detected according to the difference of intensity of the TE polarized light and the TM polarized light output by the through port and the coupling port, and result analysis is facilitated. It thus can be seen that the working principle of the optical sensor chip of the present invention is based on the rotation and separation of light polarization, it is different from the existing photonic sensor based on an interferometer structure and a resonator structure, and it does not need to use tunable laser so that the cost is low; and the optical sensor chip of the present application can be designed in different sizes, instead of a large volume, according to the needs, and can be designed into a small size chip, so that the use is facilitated.

In a feasible embodiment, the optical waveguide core further includes a second polarization rotator and a second polarization splitter; the second polarization splitter and the second polarization rotator are collinear with the first polarization rotator, the second polarization rotator is arranged between the second polarization splitter and the first polarization rotator, the second polarization rotator includes two input ports and one output port; the two input ports include a through input port and a coupling input port; an output port of the second polarization splitter is communicated with the input port of the second polarization rotator, and the output port of the second polarization rotator is communicated with the input port of the first polarization rotator; and a coupling input port of the second polarization splitter is used for transmitting input transverse electric (TE) polarized light to the second polarization rotator, the second polarization rotator is used for converting the TE polarized light into transverse magnetic (TM) polarized light, and an output port of the second polarization splitter is used for inputting the TM polarized light to the first polarization rotator. The invention has the beneficial effects that: due to the fact that the input port of the first polarization rotator can only receive the input of the transverse magnetic (TM) polarized light while the existing commonly used light source usually outputs the transverse electric (TE) polarized light, by arranging the second polarization splitter with two input ports and one output port, the output port of the second polarization splitter being communicated with the input port of the first polarization rotator, the TE polarized light can be input through the coupling input port of the second polarization splitter, the input TE polarized light can be converted into TM polarized light by the second polarization splitter, and then the TM polarized light is input into the first polarization rotator, thereby facilitating actual use. In a feasible embodiment, a structural shape of the first polarization rotator is a taper or wedge. It has the beneficial effects that: such arrangement can enable photons to undergo polarization rotation in the first polarization rotator under the action of the difference in refraction between the sample to be tested and the cladding.

In a feasible embodiment, the optical waveguide core is spirally arranged or folded in space. It has the beneficial effects that such arrangement can make the structure more compact, and can also enhance the local interaction between light waves and analytes.

In a feasible embodiment, the first polarization splitter includes a selected one of a directional coupler, an adiabatic coupler, a bend coupler, a Y-shaped separator, a multimode interferometer, a photonic crystal, a grating and a prism, and the second polarization splitter includes a selected one of the directional coupler, the adiabatic coupler, the bend coupler, the Y-shaped separator, the multimode interferometer, the photonic crystal, the grating and the prism. It has the beneficial effects that the first polarization splitter and the second polarization splitter are provided as a selected one of the directional coupler, the adiabatic coupler, the bend coupler, the Y-shaped separator, the multimode interferometer, the photonic crystal, the grating and the prism, thereby facilitating flexible use.

In a feasible embodiment, the optical waveguide core is made of at least one of silicon, silicon nitride, silicon dioxide, aluminum oxide, lithium niobate and III-V materials. It has the beneficial effects that in this way, the bottom cladding and the top cladding can be made of various materials, and the manufacturing difficulty is reduced.

In a feasible embodiment, the optical waveguide core is made of a sub-wavelength structure. It has the beneficial effects that such arrangement can further improve local sensing and increase the interaction between light and the analyte.

In a feasible embodiment, the number of the optical waveguide cores is several, and each of the optical waveguide cores is arranged between the top cladding and the bottom cladding. It has the beneficial effects that several optical waveguide cores are arranged, so that different detections can be carried out through the several optical waveguide cores at the same time.

In a feasible embodiment, the optical sensor chip is applied to at least one of biosensing, gas sensing, temperature sensing, humidity sensing, smell sensing, chemical sensing, water quality monitoring and greenhouse monitoring. It has the beneficial effects that based on the fact that different characteristics can be generated by different samples to be tested, in combination with the arrangement of the cladding, various refractive indexes can be generated, and various detection results can be obtained, so that the optical sensor chip of the present application is able to perform detection of biology, gas, temperature, humidity, chemistry, odor, water quality, greenhouse, etc.

The present invention further provides an optical sensing system, including a light source, a first photodetector, a second photodetector, a power supply, a controller, a display, a flow controller and the optical sensor chip described in any of the above feasible embodiments, wherein the light source is used for inputting light to one end of the optical sensor chip; the first photodetector and the second photodetector are arranged at the other end of the optical sensor chip; the first photodetector and the second photodetector are used for detecting photoelectric signals output by two output ports of the optical sensor chip; the display is electrically connected with the first photodetector and the second photodetector respectively; the first photodetector and the second photodetector transmit the photoelectric signals to the display; the display receives and displays the photoelectric signals; the flow controller is provided with an output interface and an input interface; the output interface and the input interface are both communicated with the opened region of the optical waveguide core; the flow controller is used for conveying a biological sample to be tested; the flow controller is used for conveying the biological sample to be tested to the opened region through the output interface and recycling the biological sample to be tested in the opened region through the output interface; the controller is electrically connected with the light source, the first photodetector, the second photodetector and the flow controller respectively; and the controller is used for respectively controlling turning-on and turning-off of the light source, the first photodetector, the second photodetector and the flow controller.

The optical sensing system of the present invention has the beneficial effects that light or photons are input into the optical sensor chip through the light source, the TE polarized light and the TM polarized light output by the biosensor are detected by the first photodetector and the second photodetector and observed through the display 9, at the same time the flow controller is arranged and is communicated with the opened region through the input interface and the output interface, and different biological samples to be tested can be added into the flow controller and can be continuously detected under the control of the controller, so that the efficiency is high, a detection structure is visual, and the use is facilitated.

In a feasible embodiment, at least one of the light source, the first photodetector or the second photodetector is integrated into the optical sensor chip. It has the beneficial effects that at least one of the light source, the first photodetector or the second photodetector is integrated into the optical sensor chip, so that the overall volume of the sensor system can be reduced, the packaging cost can be reduced, and the influence of errors caused by the installation of the light source, the first photodetector or the second photodetector on the structure can be reduced.

In a feasible embodiment, the light source is a fixed wavelength light source or a broadband light source, and the light source is a selected one of a distributed feedback laser, a vertical external cavity surface emitting laser, a superluminescent diode and a light emitting diode. A wavelength range of the light source includes a selected one of visible light, O-band light, C-band light and mid-infrared light. It has the beneficial effects that such arrangement facilitates flexibly selecting the light source in actual use.

In a feasible embodiment, the numbers of the first photodetectors, the second photodetectors and the optical sensor chips are set as N, and N is a positive integer; the optical sensing system further includes an optical splitter; the optical splitter is arranged between the light source and the optical sensor chips, the optical splitter is used for dividing light input by the light source into N sub-light sources and respectively transmitting the sub-light sources to the respective optical sensor chips, the respective first photodetectors and the respective second photodetectors are respectively arranged corresponding to the respective optical sensor chips, and the respective first photodetectors and the respective second photodetectors are respectively used for detecting the photoelectric signals output by the two output ports of the respective optical sensor chips. It has the beneficial effects that the light from one light source can be divided into a plurality of channels by setting the optical splitter, so that multiple tests can be carried out at the same time.

BRIEF DESCRIPTION OF THE DRAWINGS

FIG. 1(*b*) is a top structural diagram of an optical sensor chip in an embodiment of the present invention;

FIG. 1(*c*) is a side structural diagram of an optical sensor chip in an embodiment of the present invention;

FIG. 3(*b*) is a schematic diagram of normalized transmission total power at the through port and the coupling port as a function of the refractive index of the top cladding in FIG. 1;

FIG. 3(*c*) is a schematic diagram of a total transmission power ratio of the through port and the coupling port in FIG. 1;

REFERENCE NUMERALS IN THE FIGURES

1. bottom cladding;
2. top cladding;
3. optical waveguide core; 301. first polarization rotator; 302. second polarization rotator;
4. first polarization splitter; 401. through port; 402. coupling port;
5. second polarization splitter; 501. through input port; 502. coupling input port;
6. light source;
7. first photodetector;
8. second photodetector;
9. display;
10. controller;
11. flow controller;
12. optical sensor chip;
13. optical splitter.

DESCRIPTION OF THE EMBODIMENTS

In order to make the objectives, technical solutions and advantages of the present invention clearer, the technical solutions in the embodiments of the present invention will be described clearly and completely below in conjunction with accompanying drawings. Apparently, the embodiments described are some of embodiments of the present invention, but not all of the embodiments. All of the other embodiments, obtained by those of ordinary skill in the art based on the embodiments of the present invention without any inventive efforts, fall into the protection scope of the present invention. Unless defined otherwise, technical or scientific terms used herein have the same meaning as commonly understood by one of ordinary skill in the art to which this invention belongs. As used herein, "comprising", "including" and the similar words mean that elements or articles appearing before the word encompass the elements or articles or equivalents thereof listed after the word, but do not exclude other elements of articles.

Aiming at the problems existing in the prior art, an embodiment of the invention provides an optical sensor chip and an optical sensing system.

Figure 1:
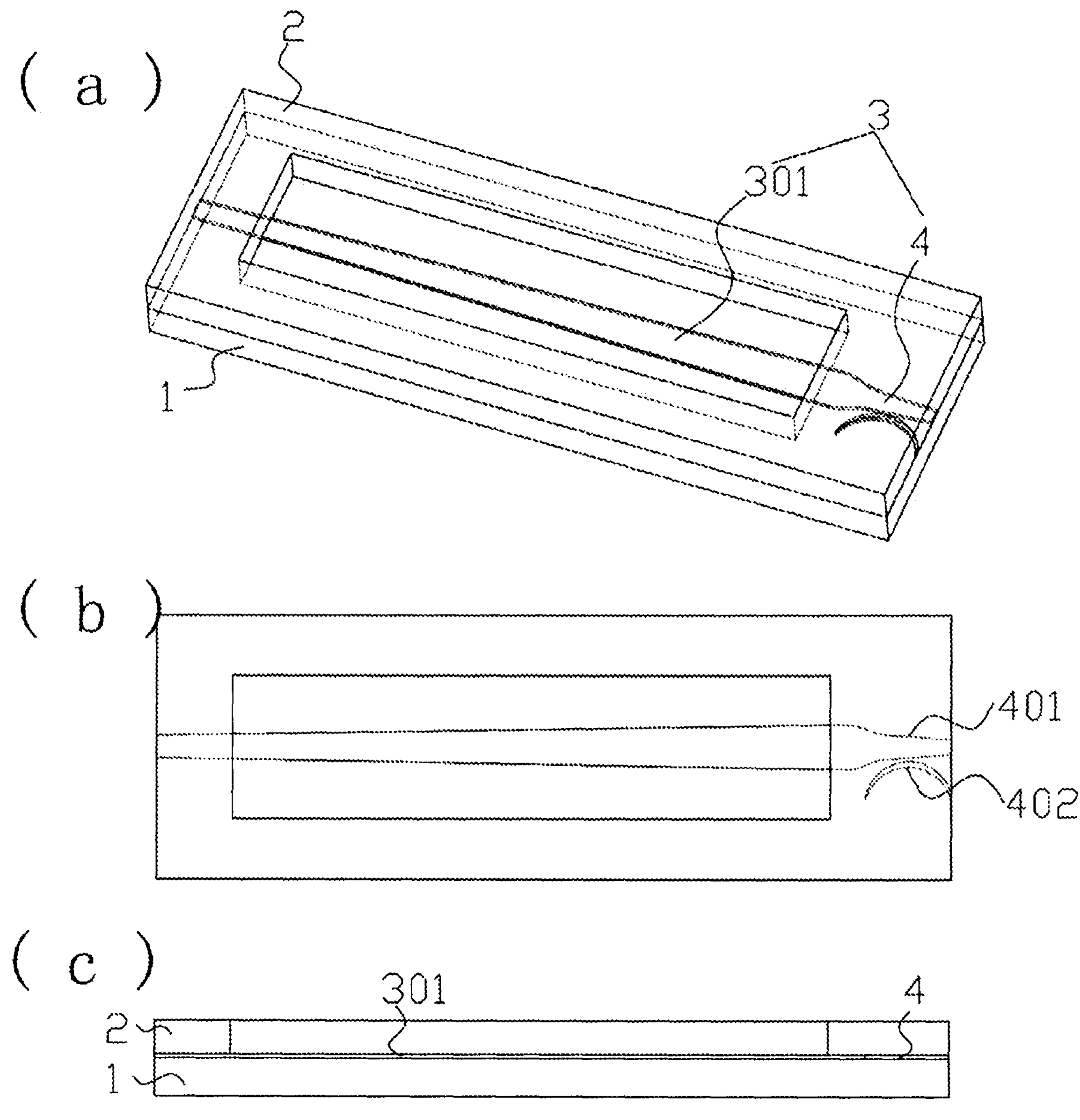
FIG. 1(*a*) is a perspective structural diagram of an optical sensor chip in an embodiment of the present invention.

FIG. 1(*a*) is a perspective structural diagram of an optical sensor chip in an embodiment of the present invention, FIG. 1(*b*) is a top structural diagram of an optical sensor chip in an embodiment of the present invention, and FIG. 1(*c*) is a side structural diagram of an optical sensor chip in an embodiment of the present invention.

In some embodiments of the present invention, referring to FIG. 1, an optical sensor chip includes a bottom cladding 1, a top cladding 2 stacked on the bottom cladding 1, and an optical waveguide core 3, wherein the optical waveguide core 3 is arranged between the top cladding 2 and the bottom cladding 1, the top cladding 2 is provided with an opened region for accommodating a sample to be tested, and a part of the optical waveguide core 3 is exposed through the opened region; the optical waveguide core 3 includes a first polarization rotator 301 and a first polarization splitter 4; the first polarization splitter 4 includes one input port and two output ports; the two output ports include a through port 401 and a coupling port 402; the through port 401 and the coupling port 402 are both used for outputting polarized light; the first polarization rotator 301 is collinear with the first polarization splitter 4, the first polarization rotator 301 is provided with a first end and a second end, the second end of the first polarization rotator is communicated with the input port of the first polarization splitter, and a dimension of the first polarization rotator 301 gradually increases along a direction from the first end to the second end.

In some specific embodiments of the present invention, the bottom cladding 1 is horizontally arranged; the optical waveguide core 3 is horizontally arranged on an upper side of the bottom cladding 1 in a left-right direction; the top cladding 2 is horizontally arranged on the upper side of the bottom cladding 1; the top cladding 2 covers the optical waveguide core 3; a rectangular hollow part is formed in a middle of the top cladding 2; a length of the opened region is smaller than that of the optical waveguide core 3; two ends of the optical waveguide core 3 are located between the top cladding 2 and the bottom cladding 1; the optical waveguide core 3 includes a first polarization rotator 301 and a first polarization splitter 4; the first polarization rotator 301 gradually becomes larger from the first end to the second end, that is, the cross-sectional area of the first polarization rotator 3 gradually becomes larger along a left-right direction; the optical waveguide core 3 can be made of various materials, including but not limited to silicon and silicon nitride; the first polarization splitter 4 is arranged on a right side of the first polarization rotator 301; an input port of the first polarization splitter 4 is coupled with a right end of the optical waveguide core 3, so that the first polarization splitter 4 can receive polarized light in the optical waveguide core 3; two output ports of the first polarization splitter 4 are a through port 401 and a coupling port 402 respectively; the through port 401 gradually decreases from left to right; the coupling port 402 is arc-shaped; generally, the polarized light output by the output port of the first polarization splitter includes transverse magnetic (TM) polarized light and transverse electric (TE) polarized light; the through port 401 can separate and output most of the TM polarized light and a small part of the TE polarized light in the light output by the first polarization rotator 301, that is, the through port 401 mainly outputs the TM polarized light; and the coupling port 402 can separate and output most of the TE polarized light and a small part of the TM polarized light in the light output by the first polarization rotator 301, that is, the coupling port 402 mainly outputs the TE polarized light. TE wave: it has a magnetic field component but no electric field component in the propagation direction, which is called transverse electric wave; TM wave: it has an electric field component but no magnetic field component in the propagation direction, which is called transverse magnetic wave.

When in use, the analyte to be tested is added into the opened region to enable the analyte to have sufficient contact with an outer side wall of the optical waveguide core 3, specifically an outer side wall at the first polarization rotator 301; in general, the top cladding 2 and the bottom cladding 1 are made of silicon; light is input at a left side of the optical waveguide core 3, photons propagate to the right along the optical waveguide core 3, when the photons pass through the opened region, the vertical symmetry of the propagation will be destroyed because the refractive index of a fluid of the analyte is different from that of the cladding, and then the light in the optical waveguide core 3 in the opened region is driven to undergo polarization rotation; specifically, the light input from the first end is in a basic TM (TM00) mode, after passing through the opened region, the output light will be completely or partially converted to the TE01 mode, which can be output at the coupling port 402 as a basic TE (TE00) mode, the remaining incompletely converted TM00 is still output at the through port 401 in the basic TM mode, that is, polarized light continues to move to the right to the first polarization splitter 4 along with the first polarization rotator 301, the through port 401 and the coupling port 402 separate and output TM polarized light and TE polarized light from the light output by the first polarization rotator 301, respectively, and material information or biological/chemical target concentration of the analyte to be tested can be traced according to the output TM polarized light and TE polarized light.

It is worth noting that the polarization rotation depends on the difference in refractive index between the top cladding 2 at the opened region, the bottom cladding 1 and the sample to be tested; generally, the top cladding 2 and the bottom cladding 1 are made of the same material, such that the polarization rotation depends on the difference in refractive index between the analyte to be tested at the opened region and the cladding, and biological, material, composition, temperature, state information and other information of the sample to be tested can be more accurately reflected.

The optical sensor chip of the present application based on the polarization rotation and separation mechanism and is different from the original interferometer and resonator structure that is based on wavelength displacement measurement, so that the need for and the dependence on the tunable laser is eliminated, and the cost is low.

To enable the optical sensor chip to operate normally, the polarization of the light input at the first port is designed to be the basic TM (TM00) mode; an evanescent field of this mode vertically extends to the top cladding 2 and the bottom cladding 1; when the mode propagates along the optical waveguide core 3 to the opened region, the evanescent field of this mode interacts with the material in the top cladding 2; and when the opened region is filled with biological or chemical targets with different concentrations, the refractive index is different, resulting in the corresponding change in the effective refractive index of the optical mode.

In addition, the opened region can be provided in any other shape as long as the analyte can be in contact with the optical waveguide core 3.

Figure 2:
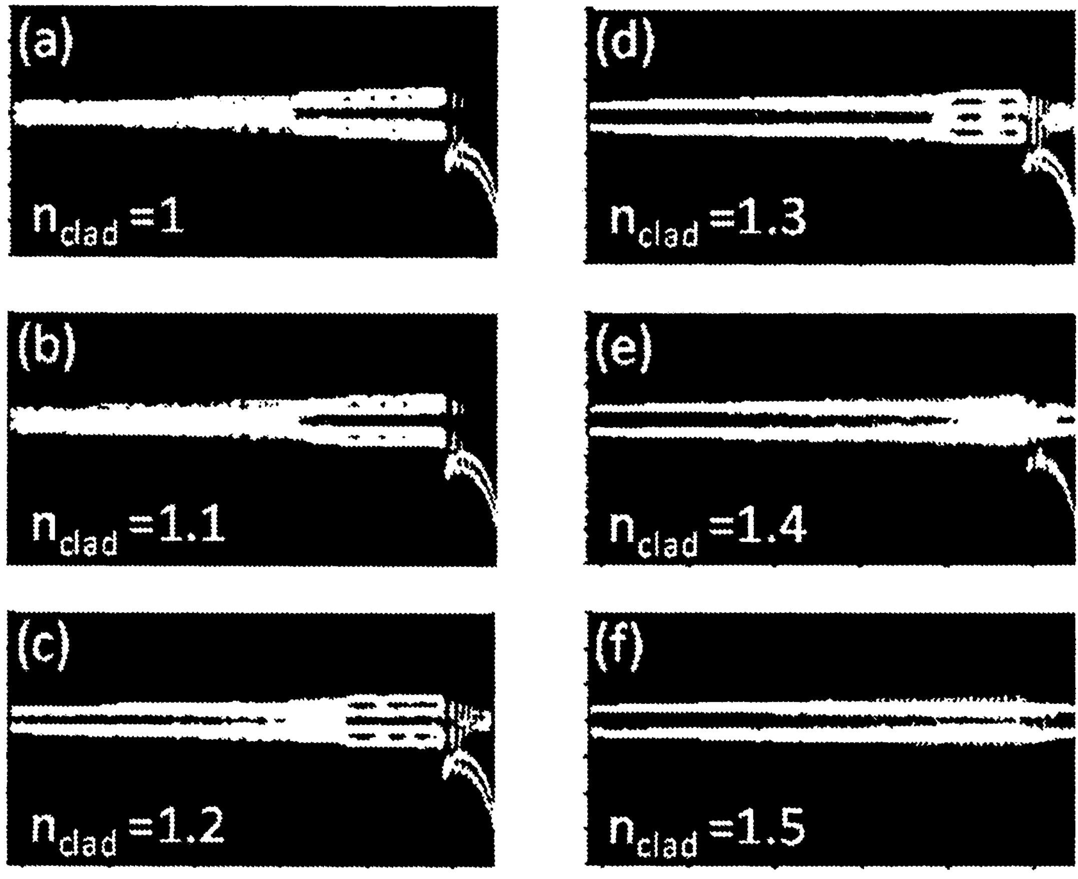
FIG. 2 is a schematic diagram of polarization rotation and polarization separation when the optical sensor chip in FIG. 1 detects analytes with different refractive indexes.

FIG. 2 is a schematic diagram of polarization rotation and polarization separation when the optical sensor chip in FIG. 1 detects analytes with different refractive indexes.

When the opened region has a certain refractive index, the TM mode can be converted into the TE mode in different degrees, and the refractive index is represented by nclad. Referring to the top view of simulation mode evolution in FIG. 2(*a*), when the opened region is filled with air, nclad=1, and the light exits in TE00 mode at the coupling port 402, while substantially no TM light exits at the through port 401. Referring to the top view of simulation mode evolution in FIGS. 2(*b*)-(*f*), if water (with a refractive index of about 1.33) or any other biological or chemical target (with a different refractive index) is added into the opened region, the rotation from TM00 to TE01 is incomplete, that is, a part of light at the coupling port 402 is output in TE00 mode, while the other part of light at the through port 401 is still output in TM00 mode, as shown in FIG. 2; as the refractive index of the substance added to the opened region increases, more light is present at the through port 401 and less light is present at the coupling port 402.

In addition, when in use, the length of the opened region can be appropriately selected, so that the top cladding 2 can be completely rotated from the TM00 mode to the TE01 mode when no object to be tested is added.

It is worth noting that FIGS. 2(*a*)-(*f*) above illustrates, only by way of example, nclad ranging from 1 to 1.5; and in actual use, the refractive index can be any value according to the added samples to be tested.

Figure 3:
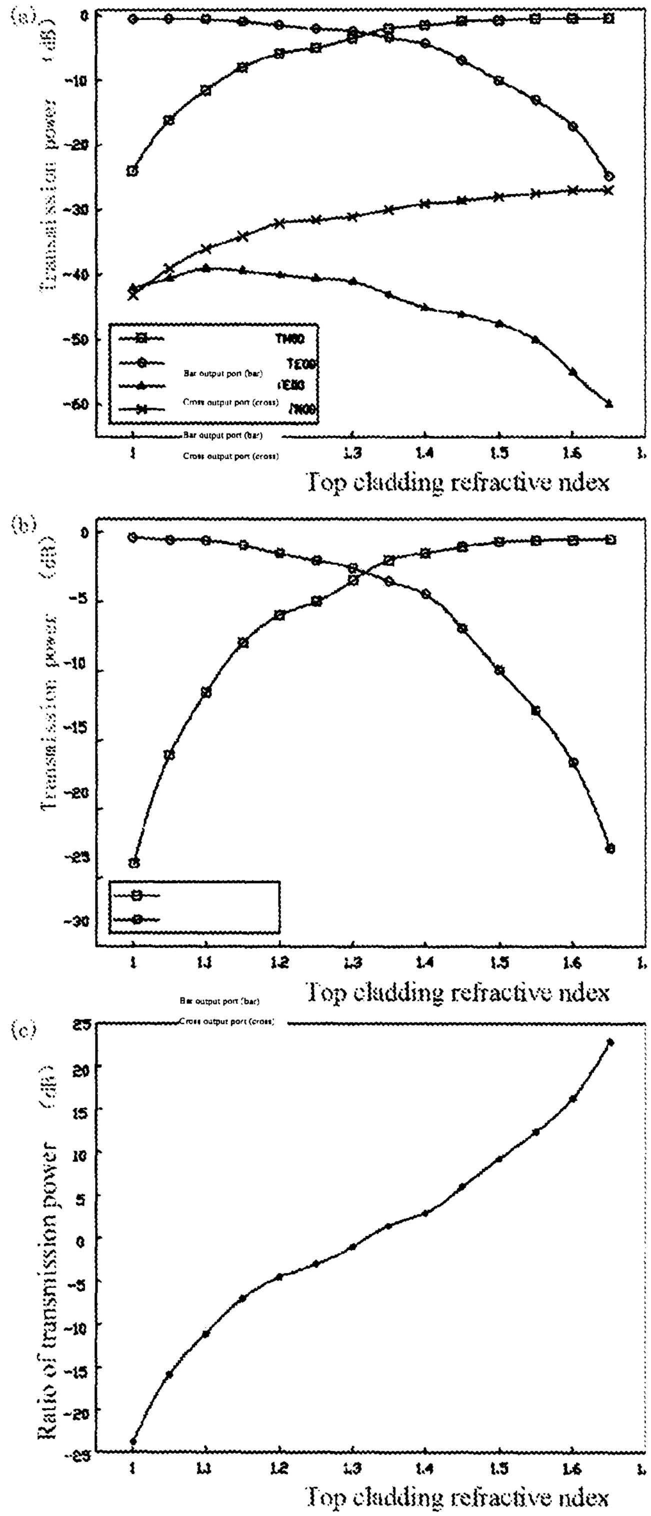
FIG. 3(*a*) is a schematic diagram of simulation results of normalized transmission power of TM00 and TE00 modes at a through port and a coupling port in FIG. 1 as a function of a refractive index of a top cladding, respectively.

FIG. 3(*a*) is a schematic diagram of simulation results of normalized transmission power of TM00 and TE00 modes at the through port and the coupling port as a function of the refractive index of the top cladding in FIG. 1, FIG. 3(*b*) is a schematic diagram showing normalized total transmission power at the through port and the coupling port as a function of the refractive index of the top cladding of FIG. 1, and FIG. 3(*c*) is a schematic diagram showing a ratio of total transmission power of the through port and the coupled port in FIG. 1; in FIG. 3, the following terms are shown: top cladding refractive index, transmission power, through port 401 (Bar), coupling port 402 (Cross), ratio of transmission power, and total power (the sum of the power of TM00 and TE00 modes), and the ratio of transmission power is in dB; referring to FIGS. 1 and 3, it can be seen that when the refractive index of the substance at the top cladding 2 changes, the ratio of transmission power changes in a wide range, for example, when the refractive index ranges from 1-1.65, the ratio ranges from −24 dB to +24 dB. Through calibration, the measured ratio can be converted into the refractive index added to the test sample in the opened region of the optical sensor chip, and then the characteristics of the test sample can be inferred.

Figure 4:
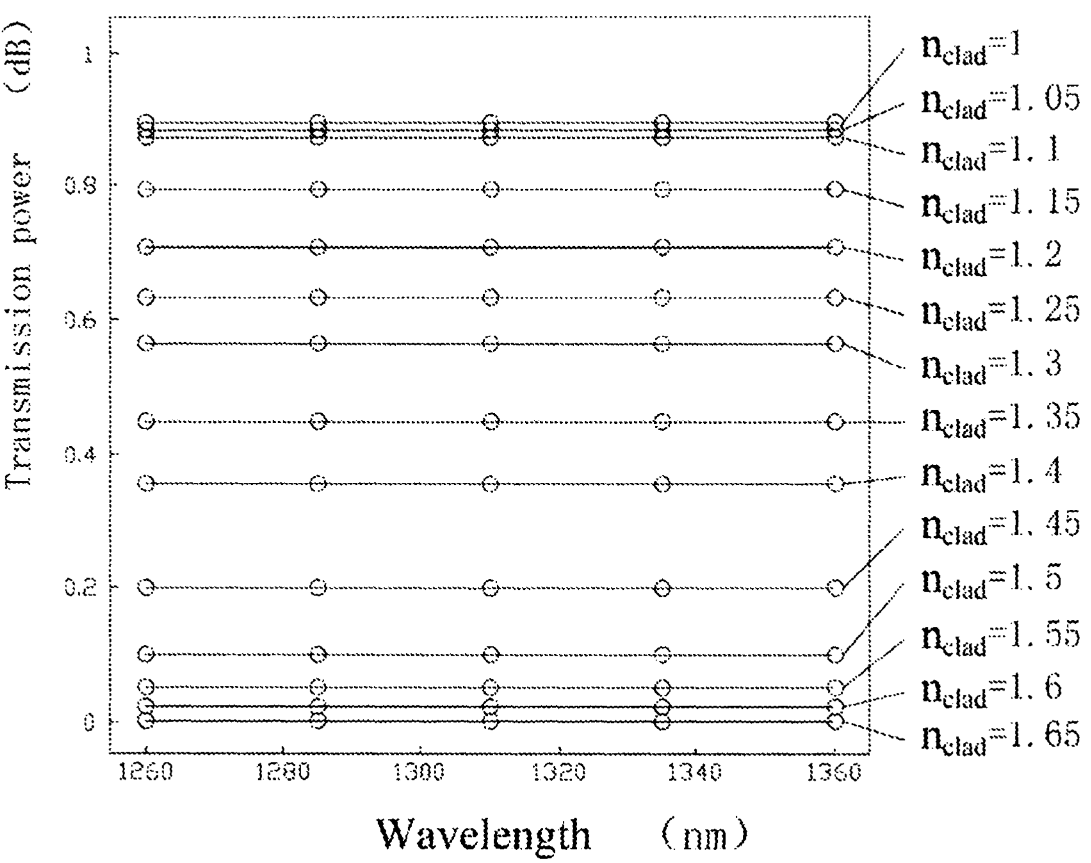
FIG. 4 is a schematic diagram of spectral simulation results of the through port in the optical sensor chip of FIG. 1 with different samples to be tested under different refractive indexes.

FIG. 4 is a schematic diagram of spectral simulation results of the through port in the optical sensor chip of FIG. 1 with different samples to be tested under different refractive indexes.

Referring to FIG. 4, it can be seen that through design optimization, the sensor can operate normally in a wide wavelength range, that is to say, with the change of the wavelength of light, the transmission power basically does not change, and it further can be seen that the optical sensor chip of the present application can use a wide spectrum range of light, and has a low dependence of transmission power on light.

In addition, referring to FIGS. 1 and 4, it can be seen that the peak transmission power is 90% instead of 100%. This is because sudden change of the refractive index of the cladding at an air/silicon oxide interface at the boundary of the opened region will lead to additional optical loss. Because the refractive index of the top cladding in a sensing region is different, the refractive index contrast at the interface will lead to different losses. However, this additional optical loss will not affect the detection result, because a sensing signal is obtained by detecting the loss difference between the signals at the through port 401 and the coupling port 402, rather than by detecting the absolute power level at each of the two output ports. The loss occurs before power distribution between the through port 401 and the coupling port 402, so that the amounts of loss of the through port 401 and the coupling port 402 are the same.

In addition, in some cases, water absorption in certain wavelength ranges may affect the performance of the existing photonic biosensors, but the optical sensor chip of the present application can offset the loss caused by the water absorption by extracting the loss difference between the signals of the through port 401 and the coupling port 402. Therefore, the photonics biosensor of the present application is robust to the problem of water absorption.

Figure 5:
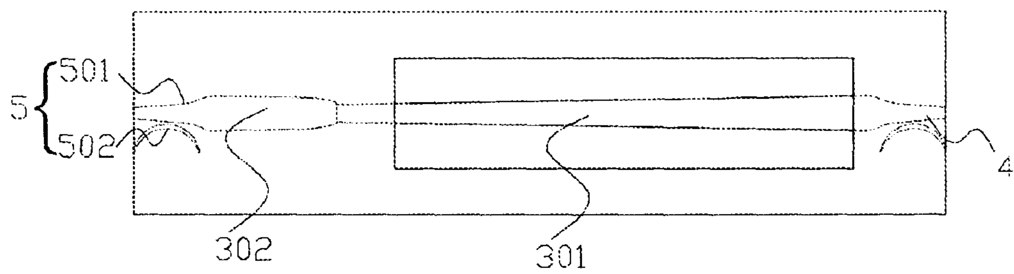
FIG. 5 is a top structural diagram of an optical sensor chip in another embodiment of the present invention.

FIG. 5 is a top structural diagram of an optical sensor chip in another embodiment of the present invention.

In some embodiments of the present invention, referring to FIG. 5, the optical waveguide core 3 further includes a second polarization rotator 302 and a second polarization splitter 5, wherein the second polarization rotator 302 and the second polarization splitter 5 are collinear with the first polarization rotator 301, the second polarization rotator 302 is arranged between the second polarization splitter 5 and the first polarization rotator 301, and the second polarization splitter 5 includes two input ports and one output port; the two input ports include a through input port 501 and a coupling input port 502; the output port of the second polarization splitter 5 is communicated with an input port of the second polarization rotator 302, an output port of the second polarization rotator 302 is communicated with the input port of the first polarization rotator 301, the coupling input port 502 of the second polarization splitter 5 is used for transmitting input transverse electric (TE) polarized light to the second polarization rotator 302, the second polarization rotator 302 is used for converting the TE polarized light into transverse magnetic (TM) polarized light, and the output port of the second polarization splitter is used for inputting the TM polarized light to the first polarization rotator 301.

In some specific embodiments of the present invention, the second polarization splitter 5 and the first polarization splitter 4 have the same structure and are arranged in a bilaterally symmetric manner; the second polarization rotator 302 is arranged between the second polarization splitter 5 and the first polarization rotator 301; the second polarization splitter 5 is coupled with a left end of the second polarization rotator 302; and a right end of the second polarization rotator 302 is coupled with a left end of the first polarization rotator 301. In general, it is required that the light launched to the optical sensor chip has TM polarization, and most of the light with TE polarization cannot be directly used. With the arrangement of the second polarization splitter 5 and the second polarization rotator 302, the light with TE polarization can be input from the coupling input port 502 and converted into TM polarized light before entering the first polarization rotator 301, thereby facilitating actual use.

In some embodiments of the present invention, referring to FIG. 1, a cone or a wedge structural shape of the first polarization rotator 301 is a taper or wedge. In some specific embodiments of the present invention, the structural shape of the first polarization rotator 301 is a taper, that is, the cross-sectional area of the first polarization rotator 301 increases from left to right.

Figure 6:
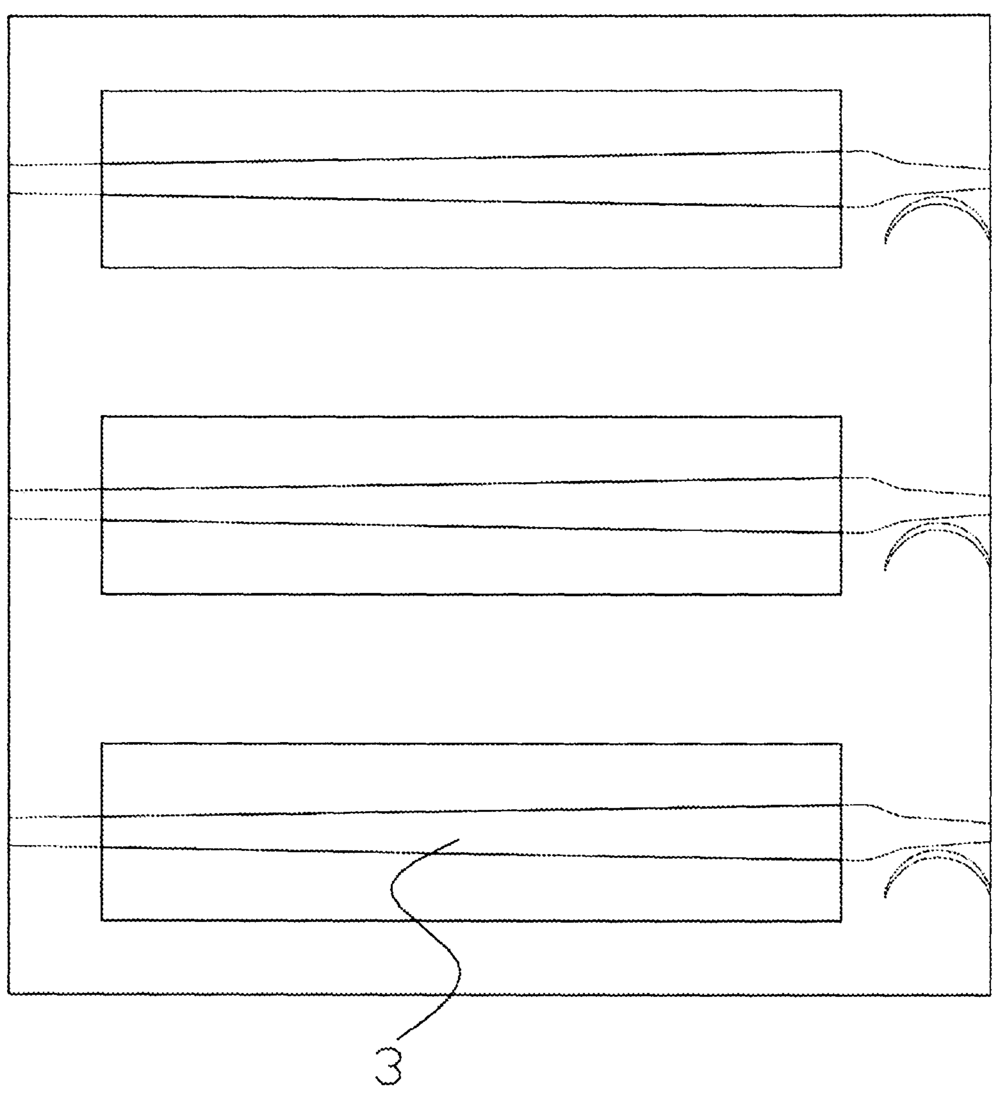
FIG. 6 is a top structural diagram of an optical sensor chip in yet another embodiment of the present invention.

FIG. 6 is a top structural diagram of an optical sensor chip in yet another embodiment of the present invention.

In some embodiments of the present invention, referring to FIGS. 1 and 6, the number of the optical waveguide cores 3 is more than one, and the optical waveguide cores are arranged in parallel. Specifically, the first polarization rotators 301 and the first polarization splitters 4 are arranged in parallel and the number of each of them is three.

It is worth noting that when the number of the first polarization rotators 301 and the first polarization splitters 4 is more than one, the arrangement direction of each of the first polarization rotators 301 and the first polarization splitters 4 can be adjusted as required.

Figure 7:
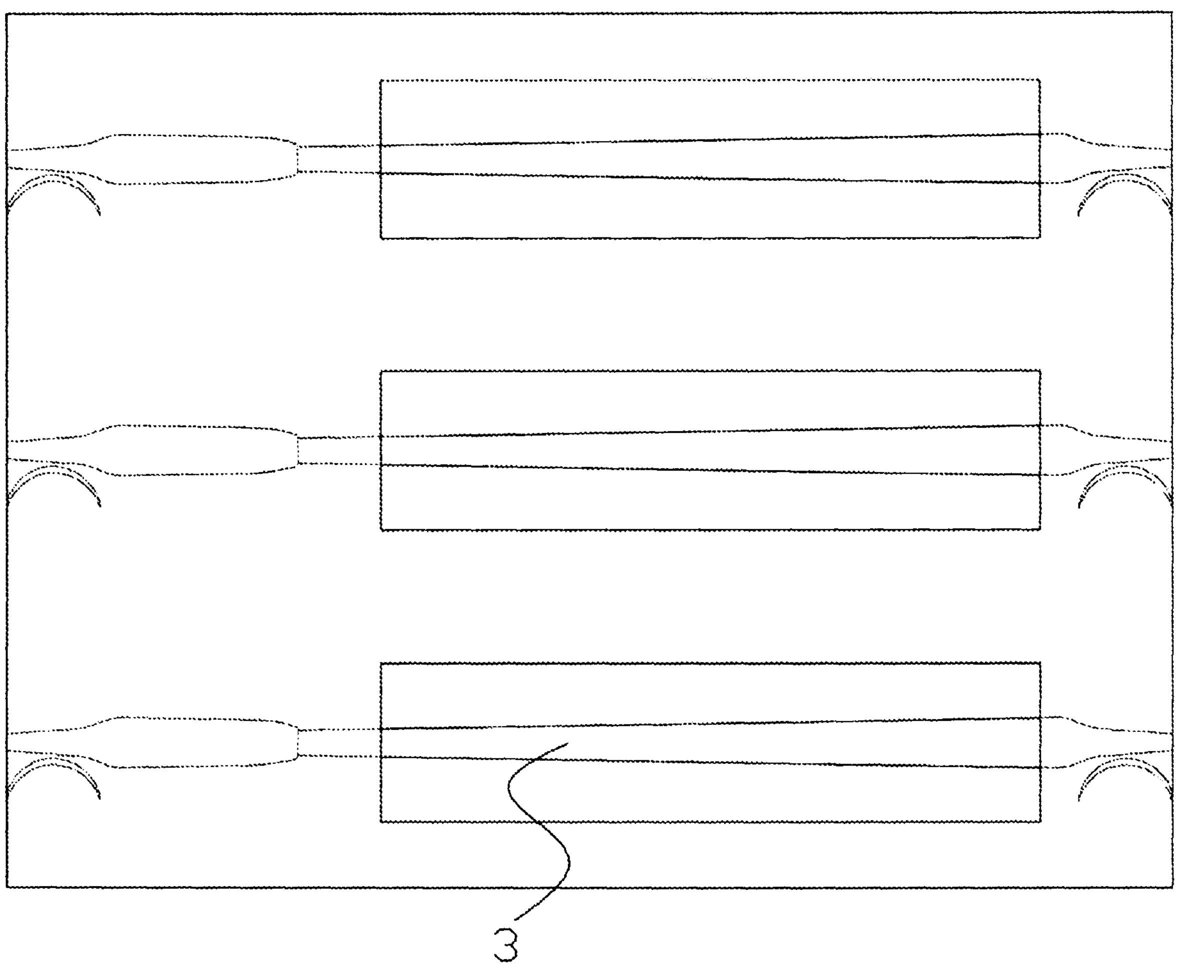
FIG. 7 is a top structural diagram of an optical sensor chip in still another embodiment of the present invention.

FIG. 7 is a top structural diagram of an optical sensor chip in still another embodiment of the present invention.

In some embodiments of the present invention, referring to FIGS. 5 and 7, the first polarization rotators 301, the first polarization splitters 4, the second polarization rotators 302 and the second polarization splitters 5 are all arranged in parallel and the number of each of them is three.

Figure 8:
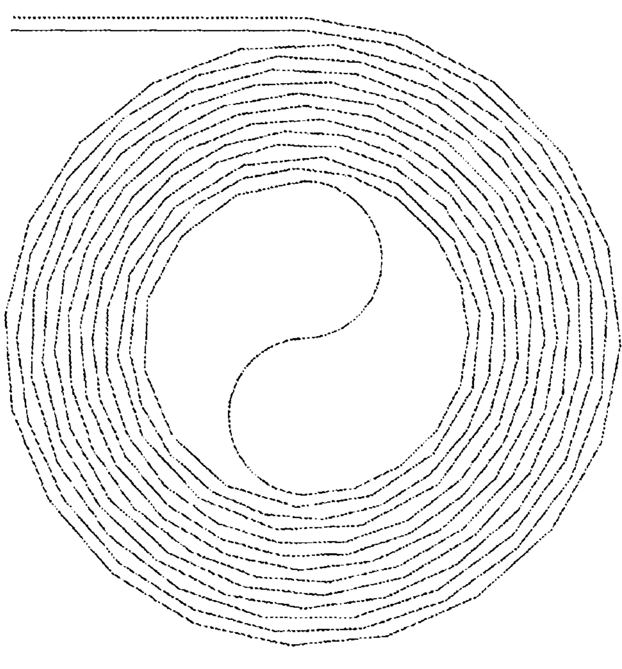
FIG. 8 is a structural diagram of a first polarization rotator in still another embodiment of the present invention.

FIG. 8 is a structural diagram of a first polarization rotator in still another embodiment of the present invention.

In some embodiments of the present invention, referring to FIGS. 1 and 8, the first polarization rotator 301 is spirally arranged in space.

Figure 9:
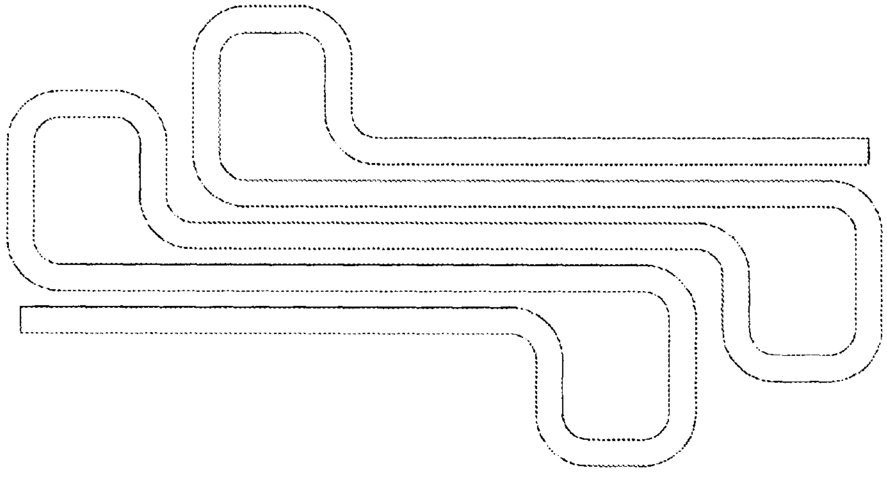
FIG. 9 is a structural diagram of a first polarization rotator in yet another embodiment of the present invention.

FIG. 9 is a structural diagram of a first polarization rotator in another embodiment of the present invention.

In some embodiments of the present invention, referring to FIGS. 1 and 9, the first polarization rotator 301 is arranged in a folded shape in space.

It is worth noting that, regardless of whether the first polarization rotator 301 is spiral or folded, the cross-sectional area of the first polarization rotator 301 is gradually increased along the path.

In some embodiments of the present invention, referring to FIG. 5, the first polarization splitter 4 includes a selected one of a directional coupler, an adiabatic coupler, a bend coupler, a Y-shaped splitter, a multimode interferometer, a photonic crystal, a grating and a prism, and the second polarization splitter 5 includes a selected one of the directional coupler, the adiabatic coupler, the bend coupler, the Y-shaped separator, the multimode interferometer, the photonic crystal, the grating and the prism.

In some embodiments of the present invention, referring to FIG. 1, the optical waveguide core 3 is made by at least a selected one of silicon, silicon nitride, silicon dioxide, aluminum oxide, lithium niobate or III-V materials.

In some embodiments of the present invention, referring to FIG. 1, the optical waveguide core 3 is made of a sub-wavelength structure.

Figure 10:
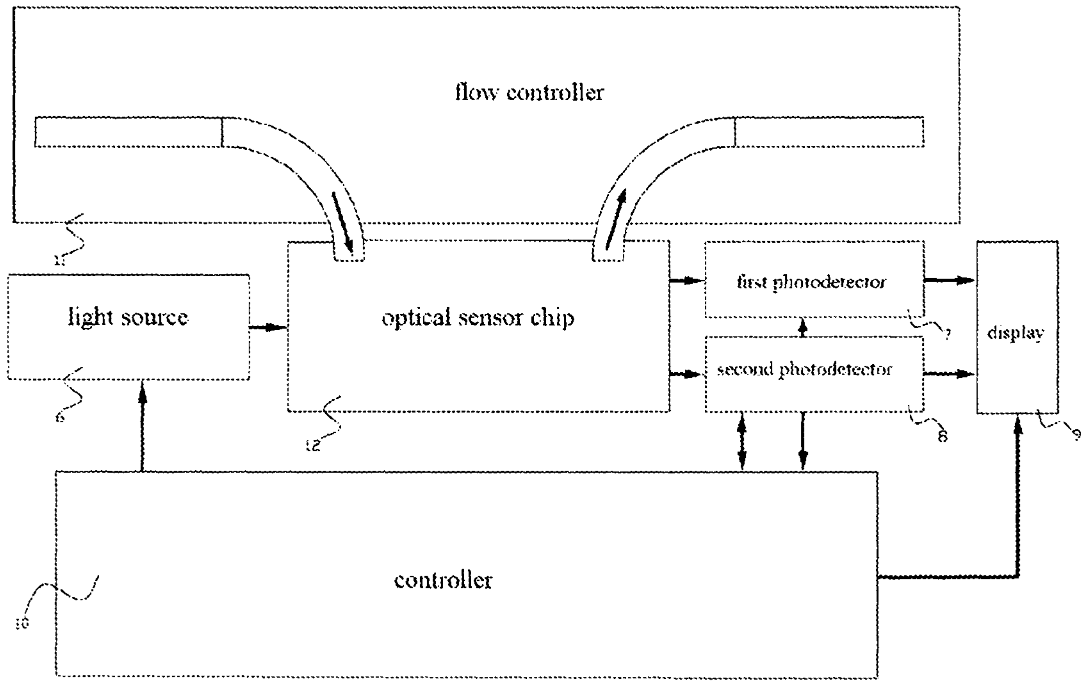
FIG. 10 is a structural block diagram of an optical sensing system in an embodiment of the present invention.

FIG. 10 is a structural block diagram of an optical sensing system in an embodiment of the present invention.

In some embodiments of the present invention, referring to FIGS. 1 and 10, an optical sensor system includes a light source 6, a first photodetector 7, a second photodetector 8, a power supply (not shown), a controller 10, a display 9, a flow controller 11 and an optical sensor chip 12 described in any of the above embodiments, wherein the light source 6 is used for inputting the light source 6 to one end of the optical sensor chip 12; the first photodetector 7 and the second photodetector 8 are arranged at the other end of the optical sensor chip 12; the first photodetector 7 and the second photodetector 8 are used for detecting photoelectric signals output from two output ports of the optical sensor chip 12; the display 9 is electrically connected with the first photodetector 7 and the second photodetector 8 respectively; the first photodetector 7 and the second photodetector 8 transmit the photoelectric signals to the display 9; the display 9 receives and displays the photoelectric signals; the flow controller 11 is provided with an output interface and an input interface; the output interface and the input interface are communicated with the opened region of the optical waveguide core 3; the flow controller 11 is used for transporting a biological sample to be tested to the opened region through the output interface, and recycling the biological sample to be tested from the opened region through the output interface; the controller 10 is electrically connected with the light source 6, the first photodetector 7, the second photodetector 8 and the flow controller 11 respectively; and the controller 10 is used for controlling the light source 6, the first photodetector 7, the second photodetector 8 and the flow controller 11 respectively.

In some specific embodiments of the present invention, the light source 6 is arranged on a left side of the optical sensor chip 12; the light source 6 is opposite to the optical waveguide core 3; light is launched to the optical sensor chip 12 through the light source 6; the first photodetector 7 and the second photodetector 8 are arranged on a right side of the optical sensor chip 12; the first photodetector 7 is in butt joint with the through port 401; the second photodetector 8 is in butt-joint with the coupling port 402; the first photodetector 7 and the second photodetector 8 respectively detect TM and TE optical signals output from two output ports of the first polarization splitter 4; at the same time, the first photodetector 7 and the second photodetector 8 transmit the detected optical signals to the display 9 for display and observation; the flow controller 11 is provided with two flow channels; a left end of one channel is communicated with an analyte to be tested, and the other end thereof is communicated with an opened region of the optical sensor chip 12; a left end of the other channel is communicated with the opened region of the optical sensor chip 12, and the other end thereof extends to be communicated with the outside; the analyte to be tested can be added to the optical sensor chip 12 from the former channel through the flow controller 11 and output through the latter channel; the controller 10 is electrically connected with the light source 6, the first photodetector 7, the second photodetector 8 and the flow controller 11 separately; and a power supply (not shown) is electrically connected with the controller 10, the light source 6, the first photodetector 7, the second photodetector 8 and the flow controller 11 separately.

When in use, the controller 10 controls the light source 6 to be turned on to input light rays into the optical sensor chip 12, the flow controller 11 is controlled to be turned on by the controller 10 to add analytes to the optical sensor chip 12, and the first photodetector 7 and the second photodetector 8 are controlled to be turned on and detect output optical signals, so as to carry out retrospective analysis on the analytes to be analyzed. In addition, different analytes can also be added in sequence through the flow controller 11, light signals can be collected during the time of different analytes, and different analytes can be detected and analyzed through one-time operation.

In some embodiments of the present invention, referring to FIGS. 1 and 10, at least one of the light source 6, the first photodetector 7 and the second photodetector 8 is integrated into on the optical sensor chip 12.

In some specific embodiments of the present invention, the light source 6, the first photodetector 7 and the second photodetector 8 are all integrated into the optical sensor chip 12.

The integration mode of the light source 6 includes directly butt-coupling the light source 6 with the optical sensor chip 12, placing the light source 6 in a cavity formed in the optical sensor chip 12, heterogeneously integrating the light source 6 in the optical sensor chip 12, and connecting the light source 6 and the optical sensor chip 12 by using optical fiber or photonic wire bonding.

In some embodiments of the present invention, referring to FIGS. 1 and 10, the light source 6 is a fixed wavelength light source or a broadband light source, and the light source 6 is a selected one of a distributed feedback laser, a vertical external cavity surface emitting laser, a superluminescent diode and a light emitting diode. A wavelength range of the light source 6 includes a selected one of visible light, O-band light, C-band light and mid-infrared light.

In some specific embodiments of the present invention, since the optical sensor chip 12 does not need to rely on the fine resolution wavelength scanning of a narrow linewidth laser, the light source can be provided as a fixed wavelength light source or a broadband light source, can also be provided as a distributed feedback laser, a vertical external cavity surface emitting laser, a superluminescent diode or a light emitting diode, and also be provided as a light source with the wavelength range being the ranges of visible light, O-band light, C-band light or mid-infrared light. This can significantly reduce the cost of the light source 6.

It is worth noting that in actual use, the light source can also be set as a tunable light source.

Figure 11:
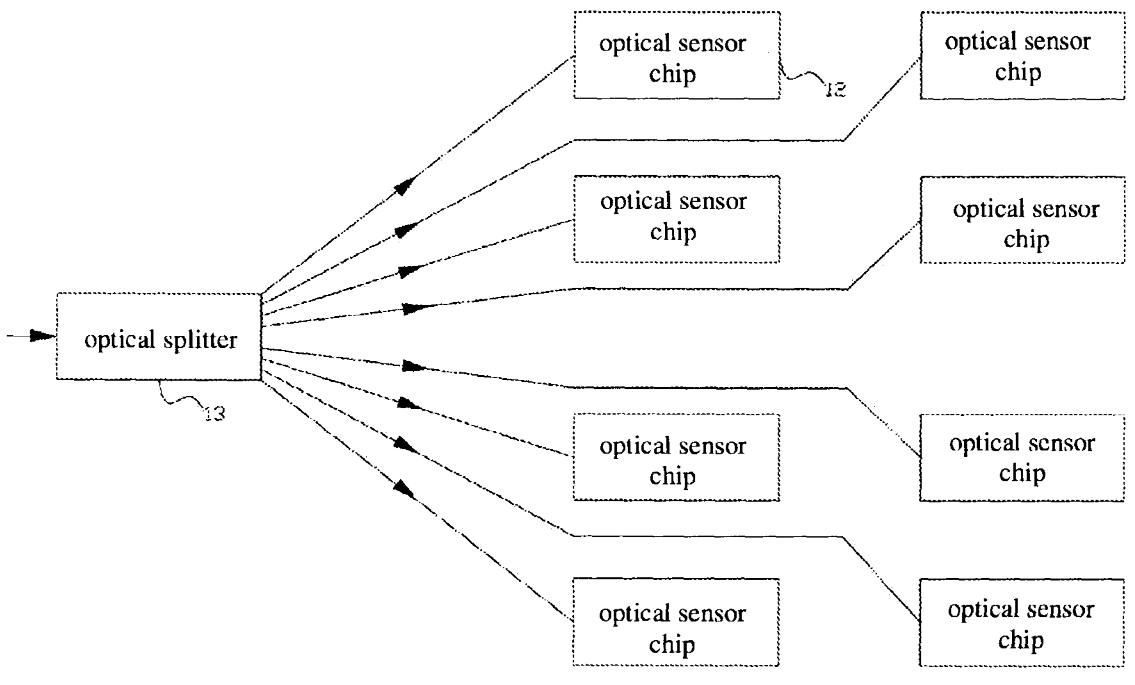
FIG. 11 is a structural diagram of an optical splitter and an optical sensor chip in yet another embodiment of the present invention.

FIG. 11 is a structural diagram of an optical splitter and an optical sensor chip in yet another embodiment of the present invention.

In some embodiments of the present invention, referring to FIGS. 10 and 11, the number of the first photodetectors 7, the second photodetectors 8 and the optical sensor chips 12 are set as N, and N is a positive integer; the optical sensing system further includes an optical splitter 13; the optical splitter 13 is arranged between the light source 6 and the optical sensor chip 12, the optical splitter 12 is used for dividing light input by the light source 6 into N sub-light sources and then transmitting the sub-light sources to the respective optical sensor chips 12, the respective first photodetectors 7 and the respective second photodetectors 8 are arranged corresponding to the respective optical sensor chips 12, and the respective first photodetectors 7 and the respective second photodetectors 8 are used for detecting the photoelectric signals output by the two output ports of the respective optical sensor chips 12.

In some specific embodiments of the present invention, the number of the first photodetectors 7, the second photodetectors 8 and the optical sensor chips 12 are each set as eight, the optical splitter 13 is arranged on the right side of the light source 6, the optical splitter 13 divides the light input by the light source 6 into eight sub-light sources, and transmits the eight sub-light sources to the eight optical sensor chips 12, the eight first photodetectors 7 and the eight second photodetectors 8 are arranged corresponding to the eight optical sensor chips 12, and detect the optical signals output by eight optical sensor chips 12 and transmit them to the display 9.

It is worth noting that the numbers of the first photodetectors 7, the second photodetectors 8, the optical sensor chips 12, and the number of the sub-light sources divided by the optical splitter 13 can be set to any value according to actual requirements, as long as they are set in a manner of corresponding to each other.

Figure 12:
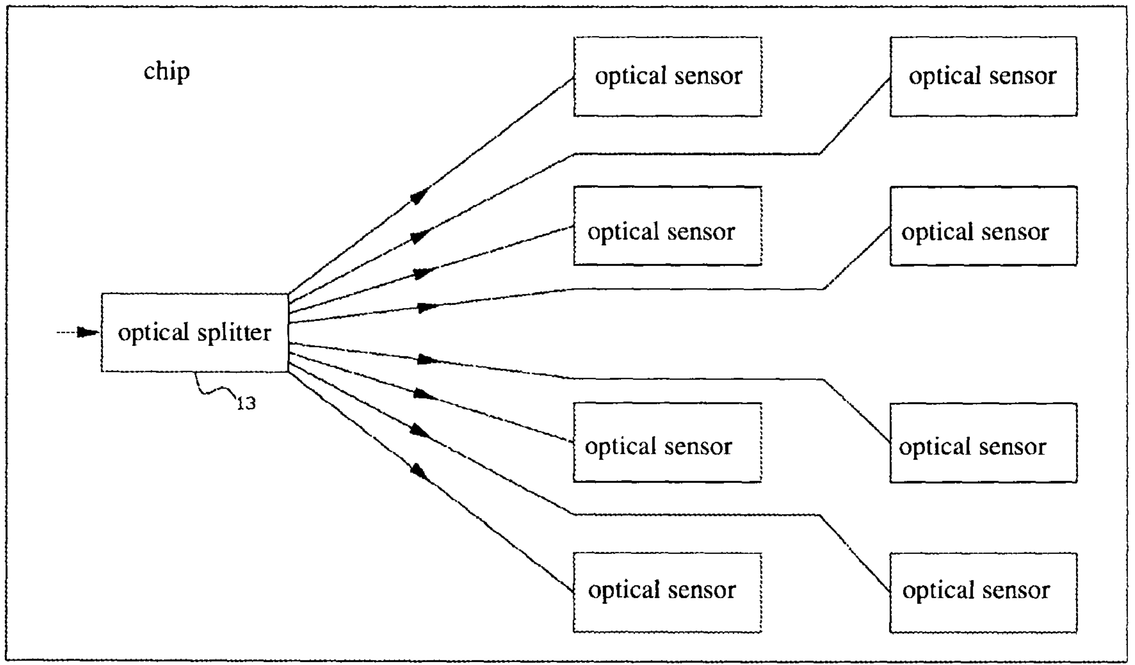
FIG. 12 is a structural diagram of the integration of an optical splitter and an optical sensor chip in still another embodiment of the present invention.

FIG. 12 is a structural diagram of the integration of an optical splitter and an optical sensor chip in still another embodiment of the present invention.

In some embodiments of the present invention, referring to FIGS. 10 and 12, the optical splitter 13 and the several optical sensor chips 12 are integrated. When in specific use, the optical splitter 13, several optical sensor chips 12, and light splitting channels corresponding to the respective sensor chips can be integrated to facilitate use.

It is worth noting that several optical sensors and the optical splitter can be directly integrated into a chip in a manufacturing process, thus eliminating the step of subsequent integration.

Although the embodiments of the present invention have been described in detail above, it is apparent to those skilled in the art that various modifications and changes can be made to these embodiments. However, it is to be understood that such modifications and changes are within the scope and spirit of the present invention as stated in the claims. Moreover, the present invention described here can have other embodiments, and can be implemented or realized in various ways.

The invention claimed is:

1. An optical sensor chip characterized in that the chip comprises a bottom cladding, a top cladding stacked on the bottom cladding and an optical waveguide core, wherein the optical waveguide core is arranged between the top cladding and the bottom cladding, the top cladding is provided with an opened region for accommodating a sample to be tested, and a part of the optical waveguide core is exposed through the opened region;

the optical waveguide core comprises a first polarization rotator and a first polarization splitter;

the first polarization splitter comprises one input port and two output ports; the two output ports comprise a through port and a coupling port; the through port and the coupling port are both used for outputting polarized light; and the first polarization rotator is collinear with the first polarization splitter, the first polarization rotator is provided with a first end and a second end, the second end of the first polarization rotator is communicated with the input port of the first polarization splitter, and a dimension of the first polarization rotator gradually increases along a direction from the first end to the second end;

a light input from the first end is in a basic TM mode, after passing through the first polarization rotator with opened region, light will be completely or partially converted to a TE mode, which is output at the coupling port as a basic TE mode, while remaining incompletely converted TM is still output at the through port in the basic TM mode; after passing through the first polarization splitter, the TM polarized light and TE polarized light from the light output by the first polarization rotator is separated and output at the through port and the coupling port, respectively; and material information or biological/chemical target concentration of the sample to be tested can be traced according to the TM polarized light being output and the TE polarized light being output.

2. The optical sensor chip according to claim 1, characterized in that the optical waveguide core further comprises a second polarization rotator and a second polarization splitter;

the second polarization splitter and the second polarization rotator are collinear with the first polarization rotator, the second polarization rotator is arranged between the second polarization splitter and the first polarization rotator, the second polarization splitter comprises two input ports and one output port, the two input ports comprise a through input port and a coupling input port, the output port of the second polarization splitter is communicated with an input port of the second polarization rotator, and an output port of the second polarization rotator is communicated with the input port of the first polarization rotator; and a coupling input port of the second polarization splitter is used for transmitting input transverse electric (TE) polarized light to the second polarization rotator, the second polarization rotator is used for converting the TE polarized light into transverse magnetic (TM) polarized light, and the output port of the second polarization rotator is used for inputting the TM polarized light to the first polarization rotator.

3. The optical sensor chip according to claim 1, characterized in that a structural shape of the first polarization rotator is a taper or wedge.

4. The optical sensor chip according to claim 1, characterized in that the optical waveguide core is arranged in a spiral or folded shape in space.

5. The optical sensor chip according to claim 2, characterized in that the first polarization splitter comprises a selected one of a directional coupler, an adiabatic coupler, a bend coupler, a Y-shaped splitter, a multimode interferometer, a photonic crystal, a grating and a prism, and the second polarization splitter comprises a selected one of the directional coupler, the adiabatic coupler, the bend coupler, the Y-shaped splitter, the multimode interferometer, the photonic crystal, the grating and the prism.

6. The optical sensor chip according to claim 1, characterized in that the optical waveguide core is made of at least one of silicon, silicon nitride, silicon dioxide, aluminum oxide, lithium niobate and III-V materials.

7. The optical sensor chip according to claim 1, characterized in that the optical waveguide core is made of a sub-wavelength structure.

8. The optical sensor chip according to claim 1, characterized in that the number of optical waveguide cores is several, and each optical waveguide core is arranged between the top cladding and the bottom cladding.

9. The optical sensor chip according to claim 1, characterized in that the optical sensor chip is applied to at least one of biosensing, gas sensing, temperature sensing, humidity sensing, smell sensing, chemical sensing, water quality monitoring and greenhouse monitoring.

10. An optical sensing system characterized in that the system comprises a light source, a first photodetector, a second photodetector, a power supply, a controller, a display, a flow controller and the optical sensor chip according to claim 1, wherein the light source is used for inputting a light source to one end of the optical sensor chip;

the first photodetector and the second photodetector are arranged at the other end of the optical sensor chip, and the first photodetector and the second photodetector are used for detecting photoelectric signals output by two output ports of the optical sensor chip;

the display is electrically connected with the first photodetector and the second photodetector separately, the first photodetector and the second photodetector transmit the photoelectric signals to the display, and the display receives and displays the photoelectric signals;

the flow controller is provided with an output interface and an input interface, the output interface and the input interface are communicated with the opened region of the optical waveguide core, the flow controller is used for transmitting a biological sample to be tested, and the flow controller is used for conveying the biological sample to be tested to the opened region through the output interface and recycling the biological sample to be tested from the opened region through the output interface; and the controller is electrically connected with the light source, the first photodetector, the second photodetector and the flow controller separately, and the controller is used for controlling the light source, the first photodetector, the second photodetector and the flow controller separately.

11. The optical sensing system according to claim 10, characterized in that at least one of the light source, the first photodetector and the second photodetector is integrated into the optical sensor chip.

12. The optical sensing system according to claim 10, characterized in that the light source is a fixed wavelength light source or a broadband light source.

13. The optical sensing system according to claim 10, characterized in that the light source is a selected one of a distributed feedback laser, a vertical external cavity surface emitting laser, a superluminescent diode and a light emitting diode.

14. The optical sensing system according to claim 10, characterized in that a wavelength range of the light source comprises a selected one of visible light, O-band light, C-band light and mid-infrared light.

15. The optical sensing system according to claim 10, characterized in that the numbers of the first photodetectors, the second photodetectors and the optical sensor chips are set as N, and N is a positive integer;

the optical sensing system further comprises an optical splitter; and the optical splitter is arranged between the light source and the optical sensor chips, the optical splitter is used for dividing light input by the light source into N sub-light sources and transmitting the sub-light sources to the respective optical sensor chips, the respective first photodetectors and the respective second photodetectors are arranged corresponding to the respective optical sensor chips, and the respective first photodetectors and the respective second photodetectors are used for detecting the photoelectric signals output by the two output ports of the respective optical sensor chips.

* * * * *